(12) United States Patent
Johnson et al.

(10) Patent No.: US 10,809,517 B2
(45) Date of Patent: Oct. 20, 2020

(54) MIRROR COATING, AND METHOD OF USE, TO REDUCE POLARIZATION SENSITIVITY

(71) Applicant: RAYTHEON COMPANY, Waltham, MA (US)

(72) Inventors: Tim P. Johnson, Torrance, CA (US); Eric C. Fest, Tucson, AZ (US)

(73) Assignee: RAYTHEON COMPANY, Waltham, MA (US)

( * ) Notice: Subject to any disclaimer, the term of this patent is extended or adjusted under 35 U.S.C. 154(b) by 249 days.

(21) Appl. No.: 15/786,860

(22) Filed: Oct. 18, 2017

(65) Prior Publication Data
US 2019/0113735 A1   Apr. 18, 2019

(51) Int. Cl.
| | |
|---|---|
| *G02B 23/02* | (2006.01) |
| *G02B 13/00* | (2006.01) |
| *G02B 5/30* | (2006.01) |
| *G02B 27/28* | (2006.01) |
| *G02B 23/06* | (2006.01) |
| *G02B 17/06* | (2006.01) |
| *G02B 5/08* | (2006.01) |

(52) U.S. Cl.
CPC ............. *G02B 23/02* (2013.01); *G02B 5/30* (2013.01); *G02B 5/3083* (2013.01); *G02B 13/008* (2013.01); *G02B 17/0636* (2013.01); *G02B 23/06* (2013.01); *G02B 27/286* (2013.01); *G02B 5/0858* (2013.01)

(58) Field of Classification Search
CPC ... G02B 1/00; G02B 1/08; G02B 1/10; G02B 17/00; G02B 17/02; G02B 17/06; G02B 17/0626; G02B 17/0647; G02B 17/0663; G02B 27/28; G02B 27/286

USPC ............. 359/48.01, 485.01, 485.03, 485.04, 359/485.07, 399, 433, 434, 435
See application file for complete search history.

(56) References Cited

U.S. PATENT DOCUMENTS

| | | |
|---|---|---|
| 3,857,112 A | 12/1974 | Epis |
| 4,198,123 A | 4/1980 | Kremen |
| 4,312,570 A * | 1/1982 | Southwell ............ G02B 27/288 359/485.03 |
| 4,923,290 A | 5/1990 | Brinkmeyer et al. |
| 5,159,481 A | 10/1992 | Maeda |
| 6,016,220 A | 1/2000 | Cook |

(Continued)

OTHER PUBLICATIONS

Howlader et. al. ("Pewriodic and Quasiperiodic nonquarterwave multilayer coating for 90-deg reflection phase retardance at 45-deg angle of incendence", Optical Engineering 34(3), 869-875 (Mar. 1995)) (Year: 1995).*

(Continued)

*Primary Examiner* — Robert E. Tallman
(74) *Attorney, Agent, or Firm* — Lando & Anastasi, LLP

(57) ABSTRACT

An imaging telescope including a first mirror configured to receive electromagnetic radiation having a first polarization state and to reflect electromagnetic radiation having a second polarization state, the first mirror including a multi-layer dielectric (MLD) coating configured to convert the first polarization state to the second polarization state, and a plurality of reflecting configured to receive the electromagnetic radiation having the second polarization state reflected from the first mirror and to reflect and focus the electromagnetic radiation having the second polarization state onto an image plane of the imaging telescope.

19 Claims, 12 Drawing Sheets

(56) References Cited

U.S. PATENT DOCUMENTS

| | | | |
|---|---|---|---|
| 6,437,904 | B1 | 8/2002 | Reeder |
| 7,046,416 | B2 | 5/2006 | Noe et al. |
| 7,848,020 | B2 | 12/2010 | Hendrix et al. |
| 7,859,977 | B2 | 12/2010 | Tan et al. |
| 2007/0058245 | A1 | 3/2007 | Thorwirth et al. |
| 2013/0114156 | A1 | 5/2013 | Cook |
| 2015/0177507 | A1 | 6/2015 | Theriault |
| 2017/0115435 | A1 | 4/2017 | Tabirian et al. |
| 2018/0106673 | A1* | 4/2018 | Pagano ............ G01J 3/2823 |

OTHER PUBLICATIONS

Rigrod et. al. ("Supression of reflection peaks in passbands of multilayer dielectric filters", Applied optics, 1971, vol. 10, No. 2, 311-316). (Year: 1971).*

International Search Report and Written Opinion in application No. PCT/US2018/045833 dated Oct. 29, 2018.

Fest, E. "VIIRS polarization sensitivity testing and analysis", Polarization Science and Remote Sensing IV, Proc. of SPIE vol. 7461(2009), p. 746102-1-12.

Kendrick et al. "Spaceborne optical coronagraph requirements including exo-solar planet and star testbed simulation", Instruments, Methods, and Missions for Astrobiology VIII, Proc. of SPIE vol. 5555 (2004), p. 258-269.

Maszkiewicz, M. "James Webb space telescope (JWST): fine guidance sensor and tunable filte rimager optical design overview and status", International Conference on Space Optics, Proc. of SPIE vol. 10565 (2010), p. 1056501-1-5.

Apfel, J.H., "Phase Retardance of Periodic Multilayer Mirrors", Applied Optics, vol. 21, issue 4, 1982, pp. 733-738.

Howlader et al., "Periodic and Quasiperiodic Nonquarterwave Multilayer Coatings for 90-deg Reflection Phase Retardance at 45-deg Angle of Incidence", Optical Engineering, vol. 34, No. 3, 1995, pp. 869-875.

Meister et al., "Moderate-Resolution Imaging Spectroradiometer Ocean Color Polarization Correction", Applied Optics, vol. 44, issue 26, 2005, pp. 5524-5535.

Southwell, W.H., "Multilayer Coating Design Achieving a Broadband 90° Phase Shift", Applied Optics, vol. 19, issue 16, 1980, pp. 2688-2692.

Spiller, E., "Totally Reflecting Thin-film Phase Retarders", Applied Optics, vol. 23, issue 20, 1984, pp. 3544-3549.

Wilkinson, T.S., "Impacts of VIIRS Polarization Sensitivity on Non-Ocean Scenes", Proc. of SPIE, vol. 9607, 2015, pp. 1-11.

* cited by examiner

MIRROR COATING, AND METHOD OF USE, TO REDUCE POLARIZATION SENSITIVITY

BACKGROUND

Optical imaging systems typically comprise a detector, usually placed within a housing having an aperture through which the detector may view an external scene, and a telescope that images the external scene onto the detector. Space-based imaging systems have the capability of scanning a wider field of view than other types of optical imaging systems. Space-based systems may also include off-axis telescope designs that utilize reflective mirrors for purposes of scanning. For many applications, the optical subsystem must also be as compact as possible.

SUMMARY

Aspects and embodiments are directed to an off-axis mirror-based optical system that includes a mirror having a multi-layer dielectric (MLD) coating.

According to one embodiment, an imaging telescope comprises a first mirror configured to receive electromagnetic radiation having a first polarization state and to reflect electromagnetic radiation having a second polarization state, where the first mirror includes a multi-layer dielectric (MLD) coating configured to convert the first polarization state to the second polarization state. The imaging telescope further comprises a plurality of reflecting mirrors configured to receive the electromagnetic radiation having the second polarization state reflected from the first mirror and to reflect and focus the electromagnetic radiation having the second polarization state onto an image plane of the imaging telescope.

In one example, the first polarization state is a linear polarization state in a plane substantially perpendicular to a direction of propagation of the electromagnetic radiation received by the first mirror and the second polarization state is one of a circular or an elliptical polarization state.

In another example, the first mirror is a flat mirror that is unpowered.

In one example, the MLD coating is configured to substantially reduce polarization sensitivity over a multi-spectral range of wavelengths of the received electromagnetic radiation. According to one example, the electromagnetic radiation received by the first mirror includes electromagnetic radiation that has a multi-spectral range of wavelengths and the MLD coating is configured to be substantially transmissive to the multi-spectral electromagnetic radiation. In one example, the multi-spectral electromagnetic radiation includes at least one range of wavelengths within the visible region of the electromagnetic spectrum and at least one range of wavelengths within the long wavelength infrared (LWIR) region of the electromagnetic spectrum. In one example, a retardance of the MLD coating is substantially constant within at least one spectral band of wavelengths within one of the visible region and the LWIR region. In one example, the retardance is about 90 degrees.

In one example, the plurality of reflective mirrors are oriented at a compound angle relative to the first mirror.

In one example, the MLD coating includes alternating layers of high and low refractive index dielectric materials. According to one example, a refractive index difference between a pair of layers adjacent to one another in the MLD coating is at least about 0.10.

In one example, the first mirror is configured to reflect at least 85% of the received electromagnetic radiation.

In one example, a diattenuation of the MLD coating is less than 1%.

In one example, the plurality of reflective mirrors includes a primary mirror optically coupled to the first mirror and configured to receive and further reflect the electromagnetic radiation having the second polarization state reflected from the first mirror, a secondary mirror optically coupled to the primary mirror and configured to receive and further reflect the electromagnetic radiation having the second polarization state reflected from the primary mirror, and a tertiary mirror optically coupled to the secondary mirror and configured to receive the electromagnetic radiation having the second polarization state reflected from the secondary mirror and to reflect and focus the electromagnetic radiation having the second polarization state onto the image plane. In another example, the primary, secondary, and tertiary mirrors are configured as a three mirror anastigmat.

According to another embodiment, a space-based imaging system comprises an imaging detector, a system aperture, a mirror optically coupled to the system aperture and configured to receive electromagnetic radiation having a first polarization state through the system aperture and reflect electromagnetic radiation having a second polarization state, the mirror including a multi-layer (MLD) coating configured to convert the first polarization state to the second polarization state, and an off-axis imaging telescope optically coupled to the mirror and configured to direct and focus the electromagnetic radiation having the second polarization state onto the imaging detector.

In one example, the first polarization state is a linear polarization state in a plane substantially perpendicular to a direction of propagation of the electromagnetic radiation received by the mirror and the second polarization state is one of a circular or an elliptical polarization state.

In one example, the electromagnetic radiation received by the mirror includes electromagnetic radiation that has a multi-spectral range of wavelengths and the MLD coating is configured to be substantially transmissive to the multi-spectral electromagnetic radiation.

According to one example, a retardance of the MLD coating is about 90 degrees. In another example, a diattenuation of the MLD coating is less than 1%.

Still other aspects, embodiments, and advantages of these example aspects and embodiments, are discussed in detail below. Moreover, it is to be understood that both the foregoing information and the following detailed description are merely illustrative examples of various aspects and embodiments, and are intended to provide an overview or framework for understanding the nature and character of the claimed aspects and embodiments. Embodiments disclosed herein may be combined with other embodiments, and references to "an embodiment," "an example," "some embodiments," "some examples," "an alternate embodiment," "various embodiments," "one embodiment," "at least one embodiment," "this and other embodiments," "certain embodiments," or the like are not necessarily mutually exclusive and are intended to indicate that a particular feature, structure, or characteristic described may be included in at least one embodiment. The appearances of such terms herein are not necessarily all referring to the same embodiment.

BRIEF DESCRIPTION OF DRAWINGS

Various aspects of at least one embodiment are discussed below with reference to the accompanying figures, which are not intended to be drawn to scale. The figures are included to provide an illustration and a further understanding of the various aspects and embodiments, and are incorporated in and constitute a part of this specification, but are not intended as a definition of the limits of any particular embodiment. The drawings, together with the remainder of the specification, serve to explain principles and operations of the described and claimed aspects and embodiments. In the figures, each identical or nearly identical component that is illustrated in various figures is represented by a like numeral. For purposes of clarity, not every component may be labeled in every figure. In the figures:

DETAILED DESCRIPTION

Figure 1:
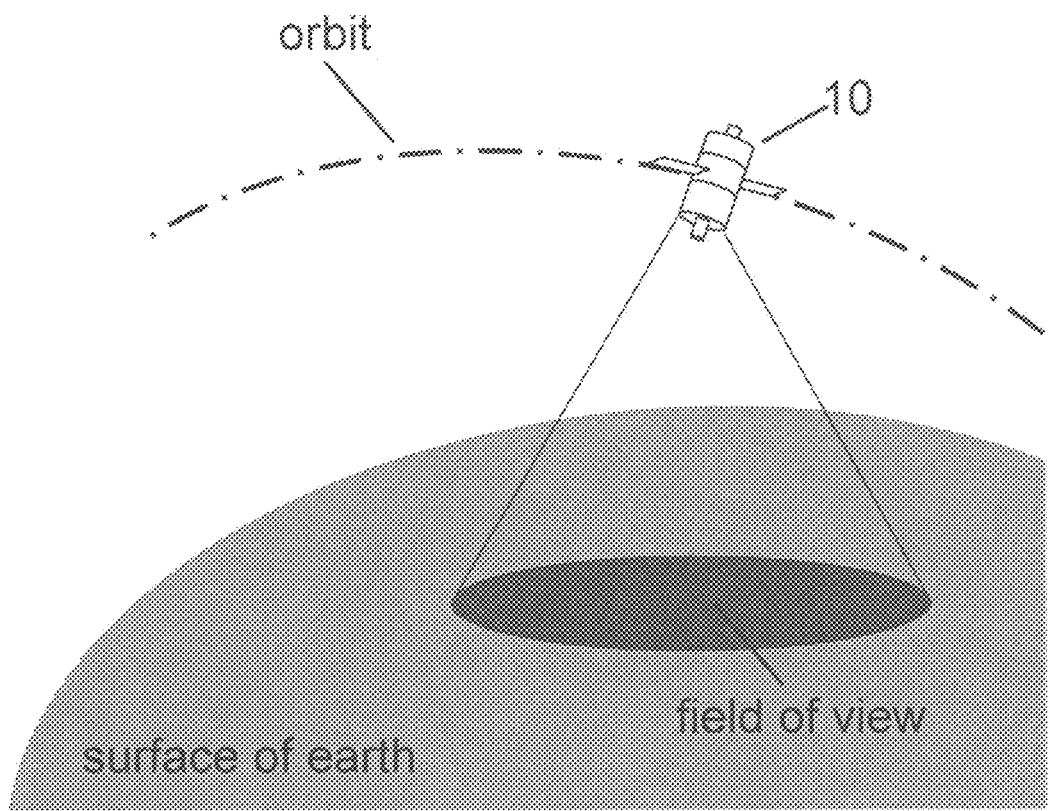
FIG. 1 is a schematic of a space-based imaging system in accordance with one or more aspects of the invention.

Space-based or high altitude imaging systems are often used for surveillance and remote sensing. An example of a space-based imaging system, generally referred to at 10, is shown in FIG. 1. As used herein, the term "space-based" means generally capable of being supported in space while in an operational state and refers to an imaging system that has a trajectory above the earth at any orbit (geostationary, substantially geostationary, medium earth orbit, low earth orbit, etc.). According to various embodiments, space-based imaging systems may be included in a satellite that orbits the surface of the earth, as shown in FIG. 1.

Space-based imaging systems may be used for imaging scenes through the Earth's atmosphere for aerial surveillance of regions of the Earth's surface. These systems utilize at least one detector having a wide field-of-view (FOV) to observe as large an area as possible, and therefore have large apertures. The imaging system may also include an imaging telescope having an off-axis design. The scenes to be imaged by such an imaging system reflect partially or primarily polarized light, usually from water surfaces. Polarization sensitivity is an inherent problem with off-axis based imaging systems and can cause radiometric error or distortions in polarized scenes. In instances where the imaging system is viewing through the atmosphere, the majority (e.g., ~90%) of the signal in the blue end of the spectrum when the imaging system is viewing through the atmosphere is polarized due to Rayleigh scatter.

Although the examples discussed herein are directed toward space-based applications, the invention may also be applied to airborne and even ground systems that include sensors that view a polarized scene, as described in more detail below.

Multi-spectral imaging typically includes capturing two-dimensional image data of a scene across multiple distinct wavelength ranges within the electromagnetic spectrum. For instance, multi-spectral imagery can be created from several wavelength bands within the visible light region (e.g., the green 500-590 nm and red 610-680 nm) as well as the infrared region (e.g., near infrared 790-890 nm). These images may then be registered. For instance, a single scene can contain three intensity images in the three wavelength bands (i.e., each pixel of the scene will have three intensity values corresponding to the three bands). This process provides information about the scene that would not be provided were image data of the scene across only a single wavelength band measured.

To reduce the polarization sensitivity within the telescopic imaging, a depolarizer, such as a quarter or half-wave plate, may be positioned in front of the input deflecting mirror. However, space-based imaging systems have stringent volume and weight limitations. Therefore, there are advantages to systems that are more compact and lightweight. A separate wave plate used in such a system must be as large as the aperture, which is impractical for space applications. Furthermore, quarter-wave plates (QWP) cannot be used for a range of detectors (visible, infrared, etc.), i.e., they are not multi-spectral, but can only be used for a single wavelength band. Other depolarizers, such as wedge scramblers, suffer from similar deficiencies, as well as difficulty in dealing with stray light.

Aspects and embodiments are directed to imaging systems, including a space-based imaging system and an imaging telescope that may be used in the space-based imaging system, in which a mirror is coated with a multi-layer dielectric (MLD) coating that is configured to substantially reduce polarization sensitivity of the imaging telescope. The MLD-coated mirror does not require the use of any additional optics, may be used with large apertures, and is transmissive to multi-spectral electromagnetic radiation. In addition, for large aperture sensors the MLD-coated mirror is lighter, less fragile, and less expensive than crystal QWPs.

The aspects disclosed herein in accordance with the present invention, are not limited in their application to the details of construction and the arrangement of components set forth in the following description or illustrated in the accompanying drawings. These aspects are capable of assuming other embodiments and of being practiced or of being carried out in various ways. Examples of specific implementations are provided herein for illustrative purposes only and are not intended to be limiting. In particular, acts, components, elements, and features discussed in connection with any one or more embodiments are not intended to be excluded from a similar role in any other embodiments.

Also, the phraseology and terminology used herein is for the purpose of description and should not be regarded as limiting. Any references to examples, embodiments, components, elements or acts of the systems and methods herein referred to in the singular may also embrace embodiments including a plurality, and any references in plural to any embodiment, component, element or act herein may also embrace embodiments including only a singularity. References in the singular or plural form are not intended to limit the presently disclosed systems or methods, their components, acts, or elements. The use herein of "including," "comprising," "having," "containing," "involving," and variations thereof is meant to encompass the items listed thereafter and equivalents thereof as well as additional items. References to "or" may be construed as inclusive so that any terms described using "or" may indicate any of a single, more than one, and all of the described terms. In addition, in the event of inconsistent usages of terms between this document and documents incorporated herein by reference, the term usage in the incorporated reference is supplementary to that of this document; for irreconcilable inconsistencies, the term usage in this document controls.

Figure 2:
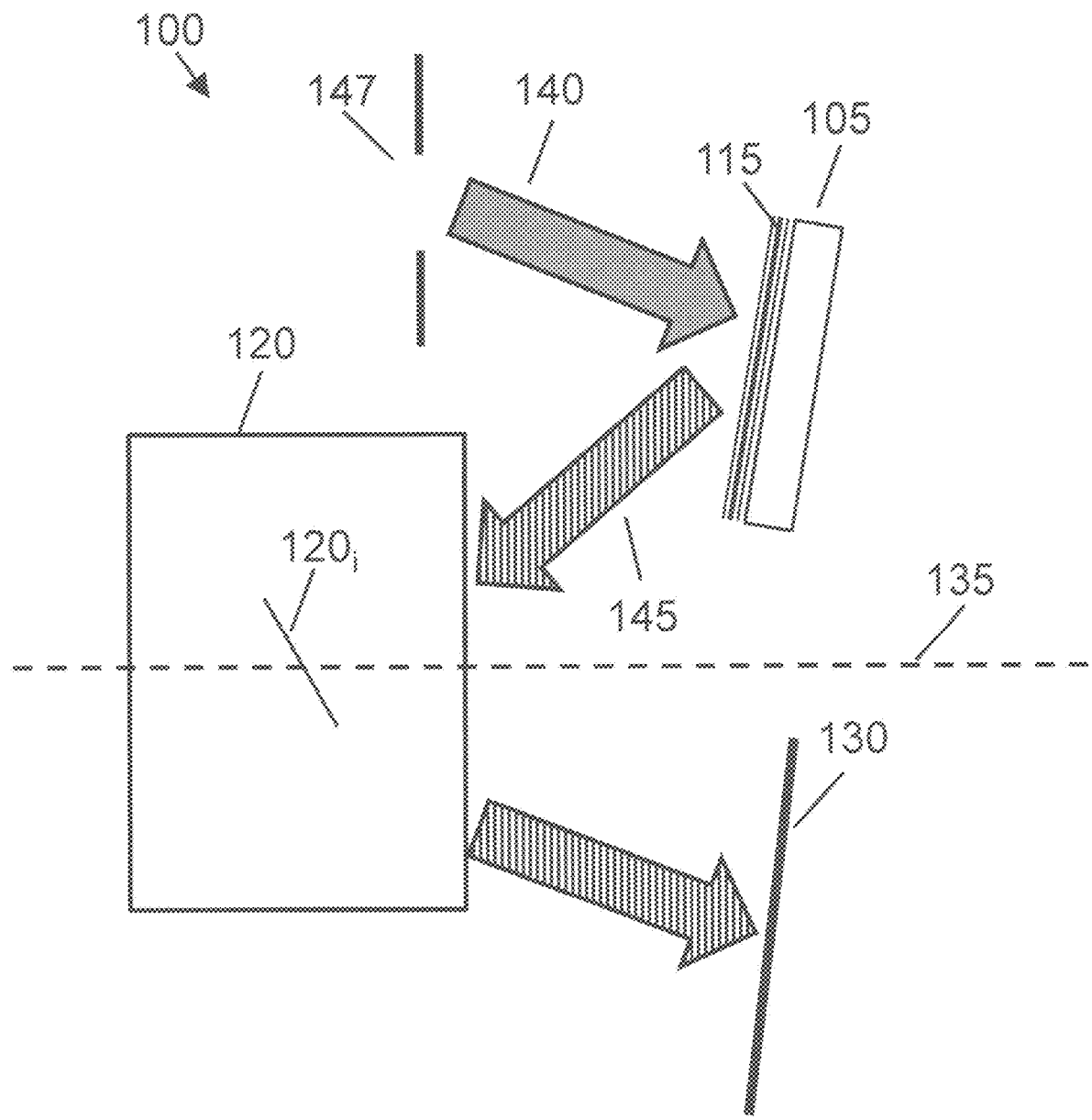
FIG. 2 is a diagram showing a schematic optical layout of one example of an imaging telescope, according to one or more aspects of the invention.

Referring to FIG. 2, there is illustrated a schematic diagram of one example of the optics for an imaging telescope, generally referred to at 100, according to one embodiment. The imaging telescope 100 includes a mirror 105 (also referred to herein as a "first mirror") with an MLD coating and a plurality of reflecting mirrors 120. The imaging telescope 100 may be arranged in a housing (not shown) designed to be launched into space. For instance, the housing may be included in a larger device, such as a satellite. The mirror 105 receives electromagnetic radiation 140 from an external scene through, for example, a system aperture. According to some embodiments, the mirror 105 is unpowered. As used herein, the term "unpowered" refers to a mirror having an unpowered mirror surface that does not include adaptive optics, such as those used in deformable mirror designs. The mirror 105 is configured to reflect incoming electromagnetic radiation 140 that has a first polarization state as electromagnetic radiation 145 that has a second polarization state. This is accomplished in part through the MLD coating on the mirror 105, which is configured to convert the first polarization state to the second polarization state. The electromagnetic radiation 145 having the second polarization state is directed via a plurality of reflecting mirrors 120 to an image plane 130.

In accordance with at least one embodiment, the imaging telescope 100 is an off-axis telescope. According to such a configuration, the entrance pupil 147 (i.e., where the incident radiation 140 enters the telescope 100) is physically offset from the optical axis 135. An off-axis telescope also views the reflected image on an area of the image plane 130 that is slightly offset from the optical axis 135. In some embodiments, one or more of the reflecting mirrors 120 and/or the mirror 105 may also be offset from the optical axis 135, i.e., off-axis.

Figure 3:
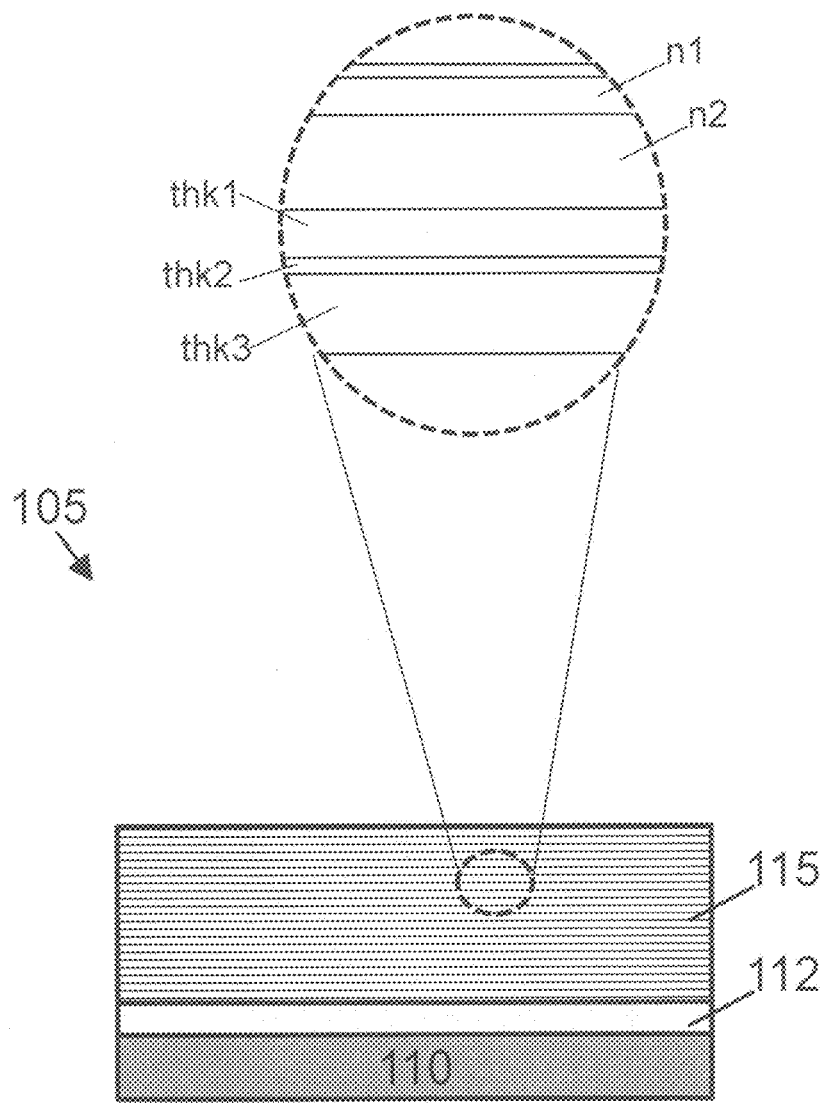
FIG. 3 is a side view of one example of a mirror with a multi-layer dielectric coating and includes an enlarged view of one portion of the mirror, according to one or more aspects of the invention.

FIG. 3 is a side view of an example of a mirror 105 for one embodiment. In some embodiments, such as that shown in FIG. 3, the mirror 105 includes a substrate 110 having a reflective coating 112 that functions as a mirror such that the substrate 110 has a reflective surface. In other embodiments, the substrate 110 may have an integrated reflective surface (e.g., by polishing etc.) such that a separate coating 112 is not necessary. The substrate 110 may be substrates known in the art, including UV fused silica, Pyrex®, Zerodur®, and other optical glasses, as well as aluminum, nickel, silicon, etc. The reflective coating 112 may be a metallic coating as known in the art, including broadband metallic coatings. Non-limiting examples of reflective coatings include aluminum, silver, gold, etc. The reflective coating 112 may be a thin layer of material, such as thicknesses in a range of 100-500 nm, although thicker and thinner layers of material are also within the scope of this disclosure.

A multi-layer dielectric (MLD) coating 115 is deposited on the reflective surface of the substrate 110. The MLD coating 115 is configured to substantially reduce polarization sensitivity of the imaging telescope 100 and includes alternating layers of high and low refractive index dielectric materials. The thicknesses of the layers of dielectric material included in the MLD coating 115 may also vary, as discussed further below.

Figure 4A:
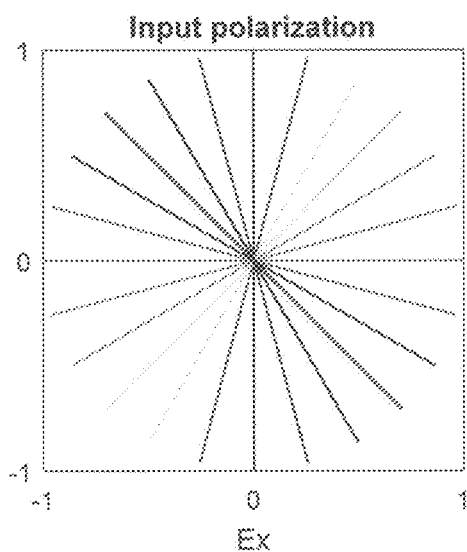
FIG. 4A is one example of a plot of the x and y electric field components of the polarization state of received electromagnetic radiation, according to one or more aspects of the invention.
Figure 4B:
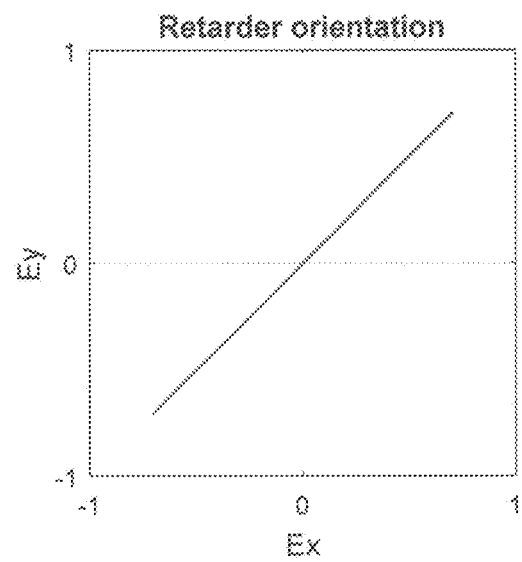
FIG. 4B is an example of a plot of the orientation of the fast axis of a quarter wave phase retardance, according to one or more aspects of the invention.
Figure 4C:
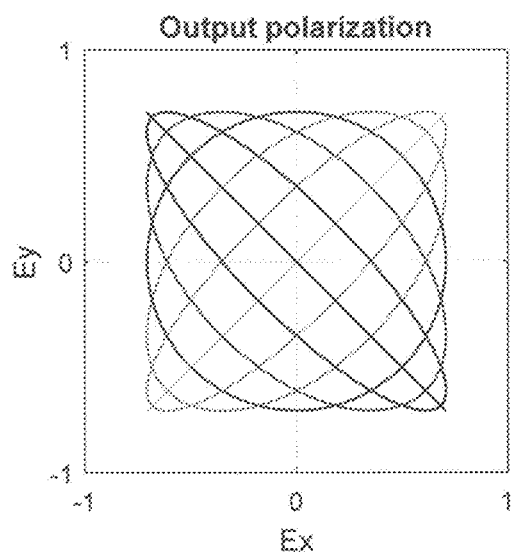
FIG. 4C is an example of a plot of the x and y electric field components of the polarization state of polarized electromagnetic radiation after the application of a quarter wave retarder, according to one or more aspects of the invention.

The MLD coating 115 is configured to alter the polarization state of the received electromagnetic radiation 140 by shifting the phase between the two orthogonal polarization components (i.e., the p-component having an electric field polarized parallel to the plane of incidence and the s-component having an electric field polarized perpendicular to this plane) of the electromagnetic radiation. For example, FIG. 4A is a plot of the x and y electric field components (e-vectors) of the polarization state of the electromagnetic radiation 140 received by the MLD coating 115 of the mirror 105. According to this particular example, the received electromagnetic radiation 140 is linearly polarized (in the plane substantially perpendicular to the direction of propagation) at arbitrary orientations, i.e., is unpolarized, as shown in FIG. 4A. FIG. 4B is an illustration of the orientation of the "fast axis" or retardance axis of the MLD coating 115, which refers to the axis having the maximum propagation speed for electromagnetic radiation. According to various aspects, the fast axis orientation is set by the compound angle of the mirror 105. The MLD coating 115 can cause a $\pi/2$ phase retardance (phase shift) between the s- and p-polarization components such that the reflected electromagnetic radiation 145 is elliptically polarized, i.e., the s- and p-components have a constant phase difference, as shown in FIG. 4C. The MLD coating 115 can also convert the s- and p-polarization components of the electromagnetic radiation 145 to exhibit circular polarization, such that they are perpendicular to one another, are equal in amplitude, and have a phase difference of $\pi/2$, as indicated in FIG. 4C. Thus, as shown in FIG. 4C, only the incident polarization states at ±45 degrees to the fast axis are converted to circular polarization, and any other incident polarization is converted to general elliptical polarization. Incident polarization states that are at zero or ±90 degrees relative to the fast axis are unaffected by the MLD coating 115. However, these unaffected polarization states are designed to be polarization-neutral to the telescope due to the orientation of the fast-axis relative to the telescope.

Circular and elliptical polarization effectively scramble the polarization into the telescope because the polarization vector, as it strikes each mirror, varies spatially since the light strikes the mirror at an angle of incidence other than zero. The MLD coating 115 therefore has the effect of "scrambling" the polarization state of the received electromagnetic radiation 140, which allows the imaging telescope to be equally efficient for all polarization directions of the incoming radiation, and hence polarization insensitive (i.e., near-zero polarization sensitivity). Thus, the MLD coating 115 is configured to substantially reduce polarization sensitivity of the imaging telescope 100 by altering the polarization state of the received electromagnetic radiation 140.

Figure 5:
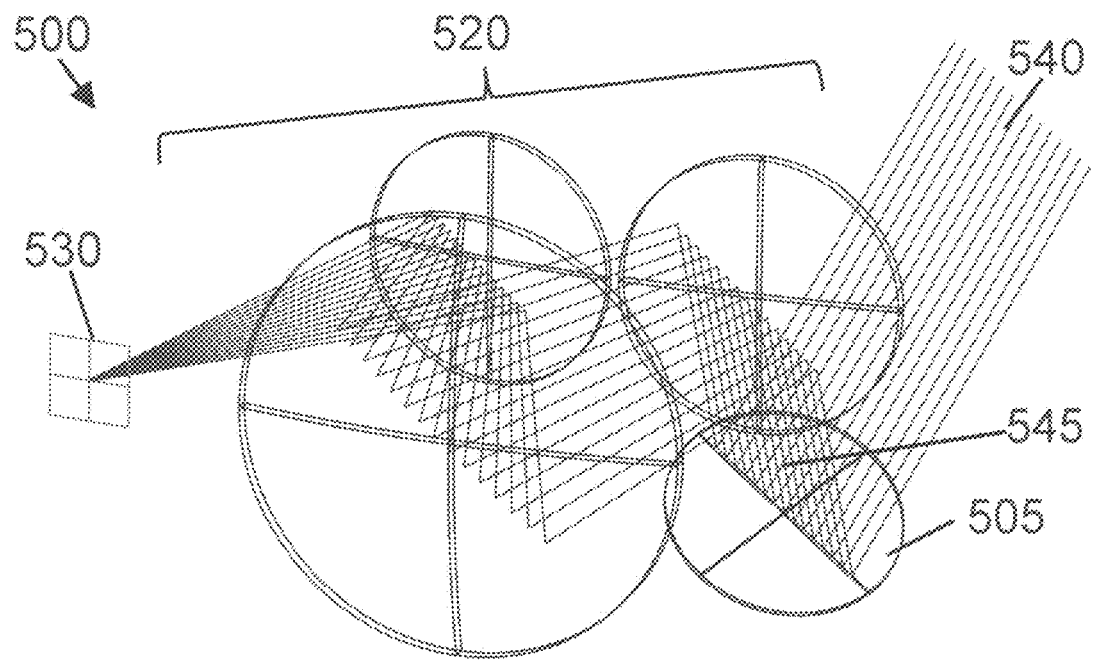
FIG. 5 is a ray trace of one example of an imaging telescope having a polarization state with an equal mix of s- and p-polarization components.

In space-based applications, light reflected from the Earth's atmosphere is linearly polarized (or partially linearly polarized) due to scattering of unpolarized sunlight by air molecules from water surfaces. Therefore, in space-based embodiments, the electromagnetic radiation 140 received by the mirror 105 has a linear polarization, meaning that the electric field is confined to a single plane along the direction of propagation. According to some embodiments, the MLD coating 115 is configured to convert the linearly polarized electromagnetic radiation to have elliptical polarization. FIG. 5 is a ray trace for one example of an imaging telescope 500 that includes a mirror 505 having an MLD coating configured to convert electromagnetic radiation 540 that is linearly polarized to elliptically polarized light 545, which is reflected off the mirror 505 and directed to the plurality of reflecting mirrors 520. In this instance, the plurality of mirrors 520 includes three mirrors that further direct the elliptically polarized electromagnetic radiation to an image plane 530.

Figure 6A:
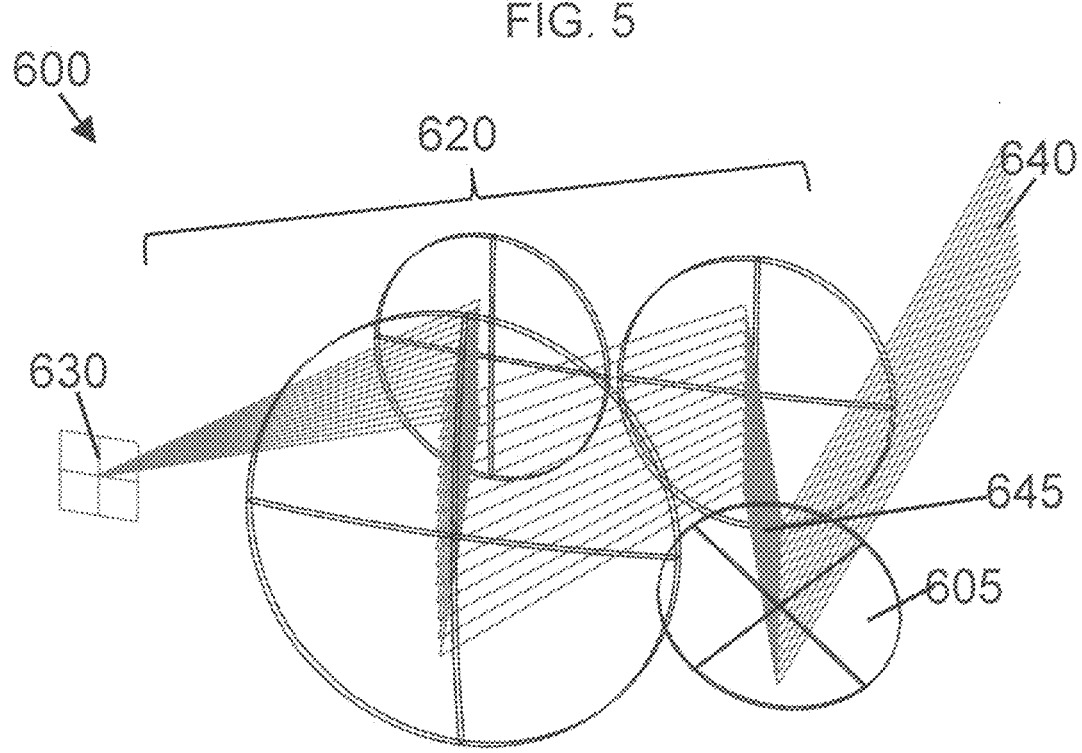
FIG. 6A is a ray trace of one example of an imaging telescope having a polarization with p-polarization components.

According to another embodiment, the MLD coating 115 of the mirror 105 is configured to convert the linearly polarized electromagnetic radiation to have circular polarization. One example of an imaging telescope having this type of configuration is shown in FIG. 6A (at 600). In this instance, the s- and p-polarization components of the electromagnetic radiation 640 are converted such that they are perpendicular to one another, are equal in amplitude, and have a phase difference of $\pi/2$, such that circularly polarized light 645 is reflected off the mirror 605. Similar to the imaging telescope of FIG. 5, a plurality of reflecting mirrors 620 (which also includes three mirrors) further reflect and direct the circularly polarized light 645 to an image plane 630.

Figure 6B:
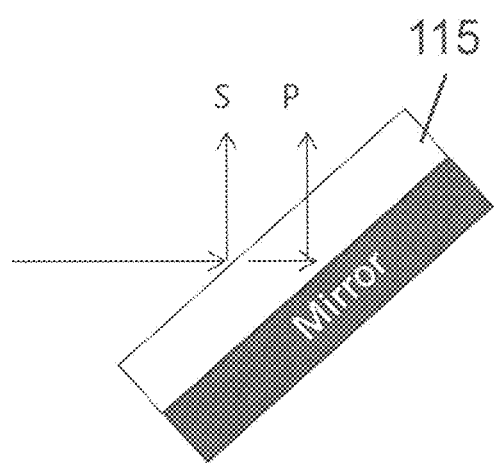
FIG. 6B is a diagram of incident s- and p-polarization components in combination with a mirror having a multi-layer dielectric coating.

FIG. 6B shows a diagram of s- and p-incident polarization components as they reflect off a mirror coated with an MLD coating 115 that is configured for circular polarization. The MLD layer 115 is configured to reflect all of the s-polarized light and only the p-polarized light reflects off the mirror and follows the same path as the s-polarized light. However, since the p-polarized light penetrates all the way through the coating 115, it has a longer path length and is therefore out-of-phase with the s-polarized light. The extra path length is equivalent to a quarter wave ($\lambda/4$), which produces circular polarization.

Returning to FIG. 3, the MLD coating 115 comprises a plurality of dielectric materials. As used herein, the term "dielectric material" refers to any material which is an electrical insulator. The dielectric materials chosen for a particular coating may be based on several factors, including the ability to transmit certain desired wavelengths of electromagnetic radiation, as discussed further below. In some instances, the dielectric materials are transparent in the wavelength range of the particular application, such as a sensor. Non-limiting examples of dielectric materials that may be used in the coating include titanium oxide, magnesium oxide, zinc oxide, silicon dioxide (silica), aluminum oxide, indium sulfide, indium selenide, tin oxide, cadmium sulfide, zinc sulfide, zine selenide, cadmium selenide, magnesium fluoride, thorium tetrafluoride, etc. The dielectric materials may be inorganic, although in some embodiments organic materials may be used. Depending on the application, two or more dielectric materials may be used in the MLD coating 115, although in some embodiments only two dielectric materials may be used. The dielectric materials may be deposited onto the reflective surface of the substrate 110 using any one of a number of thin film vacuum deposition techniques, including chemical and physical vapor deposition methods.

According to some embodiments, the MLD coating 115 includes alternating layers of high and low refractive index dielectric materials. The high and low refractive index comparison can be made at any one of a number of different reference wavelengths, and according to at least one embodiment, the reference wavelength is 550 nm. The enlarged portion of the MLD coating 115 shown in FIG. 3 includes multiple dielectric layers where the refractive index of one layer (labeled n1 in FIG. 3) has a high value and the adjacent layer (labeled n2) has a low value. For instance, in some embodiments, a refractive index difference between a pair of layers adjacent to one another in the MLD coating is at least about 0.50. In other embodiments, the refractive index difference is at least about 0.10. According to another aspect, the dielectric material having a high refractive index has a refractive index value between about 1.6 to about 2.5 and the dielectric material having a low refractive index has a refractive index value between about 1.4 to about 1.55.

One or more layers of dielectric material that comprise the MLD coating 115 may also have different thicknesses. Referring again to the enlarged portion of the MLD coating shown in FIG. 3, one layer of the MLD coating has a first thickness (labeled thk1) that is different than either a second thickness (labeled thk2) of another layer included in the MLD coating, or a third thickness (labeled thk3) of yet another layer included in the MLD coating. In some embodiments, the MLD coating 115 may have layers with all different thicknesses, but in other embodiments, there may be layers having the same thickness. In one embodiment, each layer of dielectric material included in the MLD coating 115 may be characterized as being "thin," meaning that the thickness does not exceed about two microns.

According to at least one aspect, the thickness of the dielectric material may be a function of or otherwise associated with the reference wavelength used for determining the respective high and low refractive indices of the adjacent dielectric layers. For instance, the thickness of the dielectric layer may be a fraction (or fractions) of the reference wavelength, e.g., 550 nm. One or more layers of the MLD coating 115 may have a thickness that is a quarter (i.e., ¼) of the reference wavelength. For example, if the reference wavelength is 550 nm, then one or more layers of the MLD coating 115 may be about 92 nm (550/4/1.5).

In accordance with another aspect, and referring again to FIG. 2, the electromagnetic radiation 140 received by the mirror105 may include multi-spectral electromagnetic radiation. As discussed above, multi-spectral imaging includes using multiple distinct wavelength ranges within the electromagnetic spectrum, and the wavelength ranges may be within different regions of the electromagnetic spectrum, including the visible (VIS) region having wavelengths of approximately 400-750 nm, the near-infrared (NIR) region having wavelengths of approximately 750-1400 nm, the short-wavelength infrared (SWIR) region having wavelengths of approximately 1.4-3 microns, the mid-wavelength infrared (MWIR) region having wavelengths of approximately 3-8 microns, the long-wavelength infrared (LWIR) region having wavelengths of approximately 8-15 microns, and the far-infrared (FIR) region having wavelengths of approximately 15-1000 microns. Multi-spectral is not to be confused with hyper-spectral, which refers to multiple contiguous spectral bands.

According to at least one embodiment, the MLD coating 115 is configured to substantially reduce polarization sensitivity of the imaging telescope 100 over a multi-spectral range of wavelengths. For example, the electromagnetic radiation 140 may be multi-spectral radiation and the MLD coating 115 of the mirror 105 may be configured to be substantially or completely transmissive to the multi-spectral radiation. For instance, according to one embodiment, the MLD coating 115 is transmissive to both the VIS spectral range and at least one of the IR (e.g., NIR, SWIR, MWIR, LWIR, FIR) spectral regions. In one embodiment, the electromagnetic radiation includes at least one range of wavelengths within the VIS region of the electromagnetic spectrum and at least one range of wavelengths within the LWIR region of the electromagnetic spectrum. According to some embodiments, the MLD coating 115 may be transmissive to one or more bands of wavelengths in the VIS spectral region and one or more bands of wavelengths in the IR spectral region. For example, according to one embodiment, the MLD coating 115 is transmissive to one or more bands of wavelengths in the VIS spectral region and one or more bands of wavelengths in the NIR spectral region. In some embodiments, the MLD coating 115 is transmissive to light having a wavelength from about 400 nm to about 15 microns. A specific example of a multi-spectral MLD coating 115 discussed below in reference to FIGS. 10 and 11. According to some embodiments, the band of wavelengths may be 20-100 nm wide. For instance, the example discussed below and shown in FIG. 11 has bands of wavelengths that are about 15-40 nm wide, but it is to be appreciated that wider or narrower bands are within the scope of this disclosure.

The transparency of the dielectric layers also allows for the reflective surface of the substrate of the mirror 105 to reflect at least a portion of the electromagnetic radiation to the reflecting mirrors 120. For instance, as described above in reference to FIG. 6B according to some embodiments, the s-polarized light may be reflected by the MLD coating 115, whereas the reflective surface of the mirror reflects the p-polarized light.

Returning to FIG. 2, the imaging telescope 100 also includes a plurality of reflecting mirrors 120. The number of mirrors (indicated as $120_i$ in FIG. 2) and the configuration of the mirrors may be dependent on a number of factors, including design considerations and a desired application. For instance, using multiple mirrors may allow for the total length of the imaging telescope to be shortened.

The plurality of reflecting mirrors 120 provide reflective surfaces on which the electromagnetic radiation 145 may be reflected and directed to the image plane 130. In accordance with at least one embodiment, the plurality of reflecting mirrors 120 are oriented at a compound angle relative to the mirror 105. Using the example discussed above, not all of the input orientations for the linearly polarized electromagnetic radiation 140 may be phase-shifted by the MLD coating 115, so positioning the mirror 105 at a compound angle ensures that complete polarization scrambling for all input polarization orientations is achieved.

The mirrors $120_i$ included in the plurality of mirrors 120 may be made from any one of a number of suitable materials, which may be selected based on factors such as, but not limited to, cost and/or weight of the material, and the operational wavelength range(s) of interest. Non-limiting examples of materials that may be used to fabricate the mirrors include Aluminum (Al), Beryllium (Be), Silicon Carbide (SiC), and single crystal Silicon (SCSi).

Figure 7:
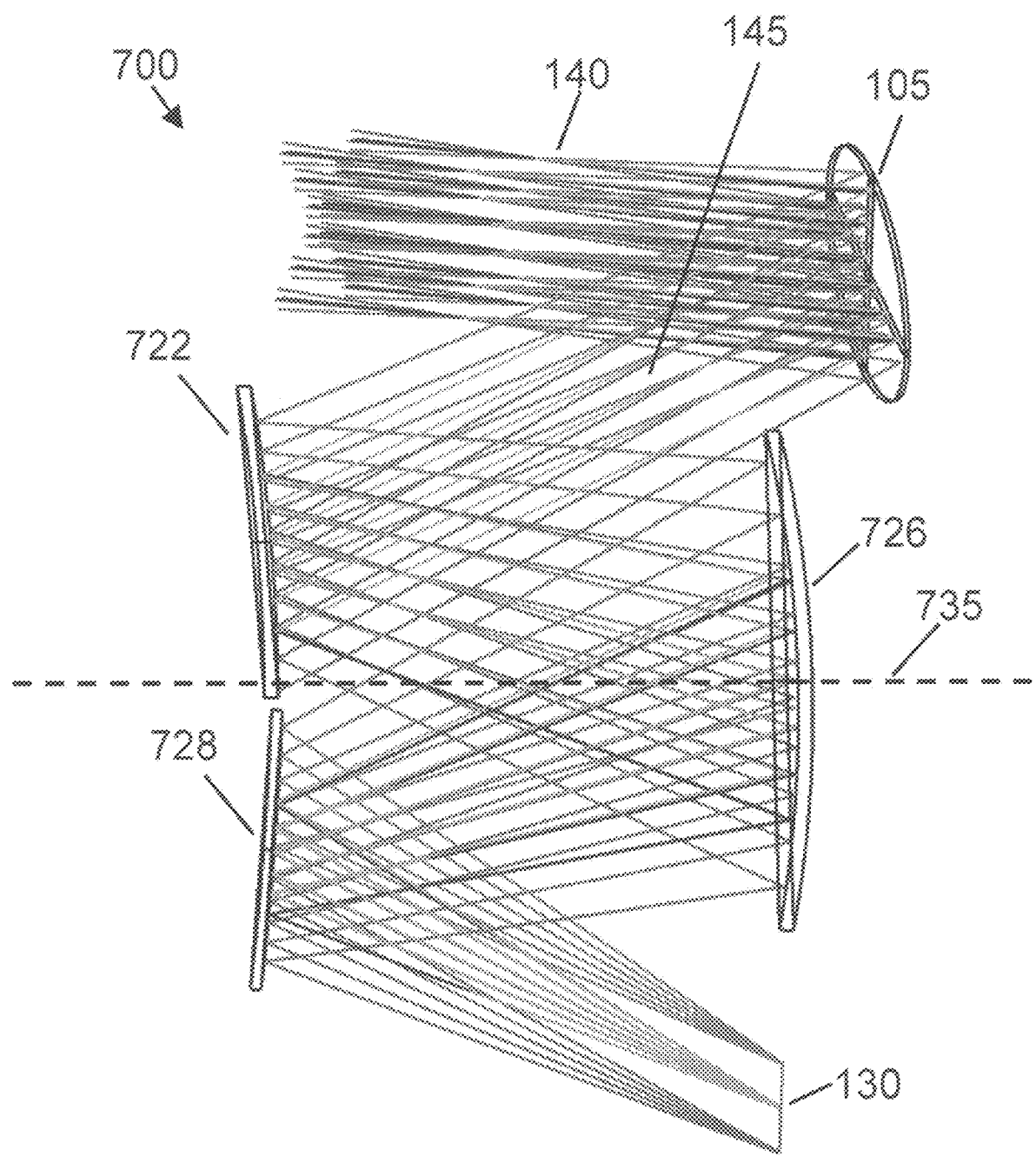
FIG. 7 is a ray trace of one example of an imaging telescope, according to one or more aspects of the invention.

FIG. 7 is a ray trace for one example of an off-axis imaging telescope 700 that is configured to have a three-mirror arrangement for the plurality of mirrors. The imaging telescope 700 includes a primary mirror 722, a secondary mirror 726, and a tertiary mirror 728. The mirror 105 is configured to convert electromagnetic radiation 140 that is linearly polarized and reflect it as electromagnetic radiation 145 that is one of elliptical or circular polarization. The primary 722, secondary 726, and tertiary 728 mirrors are oriented at a compound angle relative to the mirror 105. As shown in FIG. 7, the primary mirror 722 is optically coupled to the mirror 105 and is configured to receive and further reflect the electromagnetic radiation 145 reflected from the mirror 105 to the secondary mirror 726. The secondary mirror 726 is optically coupled to the primary mirror 722 and is configured to further reflect the electromagnetic radiation reflected from the primary mirror 722 to the tertiary mirror 728. The tertiary mirror 728 is optically coupled to the secondary mirror 728 and is configured to receive the electromagnetic radiation reflected from the secondary mirror 728 and focus the electromagnetic radiation onto the image plane 130. In this embodiment, the mirrors may be configured such that the primary 722 and secondary 726 mirrors constitute a telephoto objective forming an intermediate image, which is then relayed to the image plane 130 by the tertiary mirror 728.

Figure 8:
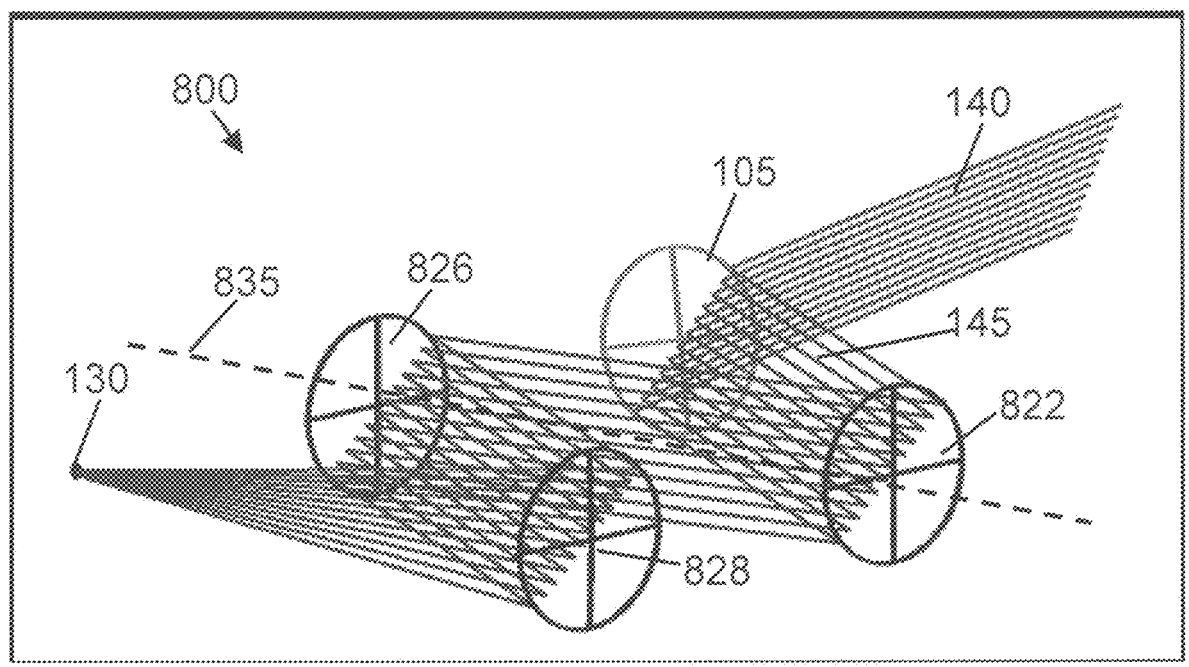
FIG. 8 is a ray trace of another example of an imaging telescope, according to one or more aspects of the invention.

FIG. 8 is another ray trace example of an off-axis imaging telescope 800 that also includes a three mirror arrangement that functions in a similar manner as imaging telescope 700 of FIG. 7. A primary mirror 822, a secondary mirror 826, and a tertiary mirror 828 are oriented at a compound angle from the mirror 105.

In accordance with certain embodiments, the primary, secondary, and tertiary mirrors, such as those shown in the imaging telescopes 700 and 800 of FIGS. 7 and 8, may be configured as a three mirror anastigmat. A three-mirror anastigmat (TMA) is one type of all-reflective system having a wide range of applications and may function as a re-imaging system, having an objective portion that forms an intermediate image and a relay portion that relays the intermediate image to a plane for viewing. The TMA permits correction of three fundamental types of geometric aberrations: spherical aberration, coma and astigmatism (three mirrors being the minimum number of elements required for correction of these aberrations in the absence of certain symmetry conditions). The TMA can also be designed to correct for curvature of the field of view. It will be appreciated by those skilled in the art, given the benefit of this disclosure that the plurality of mirrors 120 is not limited to the TMA arrangement illustrated in FIGS. 7 and 8. For example, the plurality of mirrors 120 may include a four-mirror anastigmat arrangement.

Although the examples described herein include off-axis telescopes having reflective elements, it is to be appreciated that the mirror 105 having the MLD coating 115 may also be applied to any off-axis telescope, including those with refractive elements and combined reflective and refractive elements, such as catadioptric telescopes.

According to one embodiment, the mirror 105 may be a flat mirror. For instance, the reflective surface of the mirror 105 may have a flatness of less than 1 micron, and in some embodiments, has a flatness that is less than 0.5 microns. According to certain embodiments, the mirror 105 has a flatness of approximately $\lambda/4$ for the wavelength range concerned. In other embodiments, the mirror 105 has a flatness of approximately λ/8, λ/10, or λ/20. Since the MLD coating 115 is multi-spectral, the angle of incidence range is limited, meaning that at larger angles of incidence the MLD coating 115 will no longer have an orientation close to 45 degrees relative to the electric field vector of the incident wave. As a result, the polarization conversion of the MLD coating 115 degrades as the angle of incidence (AOI) increases, which would make the MLD coating 115 unusable beyond a limited range of incidence angles. A flat mirror may therefore be used to address this issue.

Although the embodiments described above refer to an imaging telescope that includes or otherwise integrates the mirror having an MLD coating, it is to be appreciated that the mirror 105 may also be positioned in front of an imaging telescope. A space-based imaging system having such a configuration is described below in reference to FIG. 9.

Figure 9:
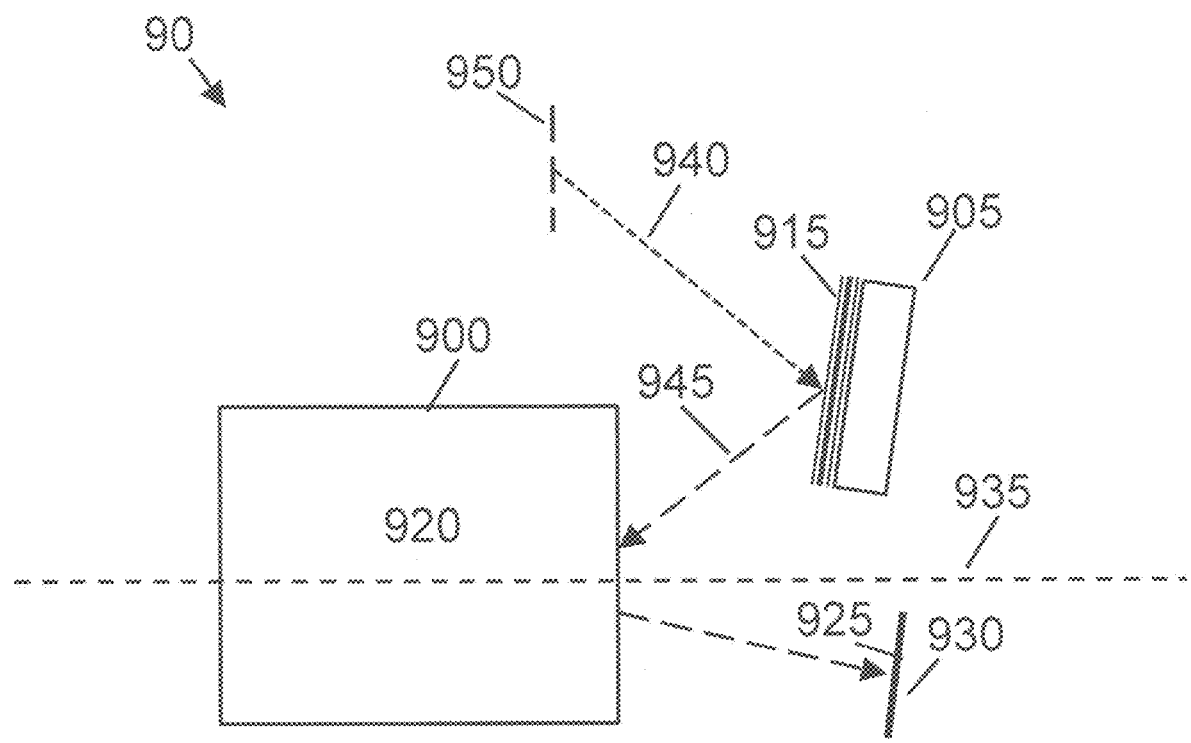
FIG. 9 is a block diagram of one example of space-based imaging system, according to aspects of the invention.

Referring now to FIG. 9, there is illustrated a block diagram of one example of a space-based imaging system 90, according to certain embodiments. The space-based imaging system 90, also referred to herein as simply "imaging system," includes a system aperture 950, a mirror 905, an imaging telescope 900, and an imaging detector 925.

The system aperture 950 of the imaging system 90 may be very large, for example, in excess of 150 cm, several meters, or larger, to achieve good image resolution in a space-based platform. Electromagnetic radiation 940 from a scene having a first polarization state enters the imaging system 90 through the aperture 950 and is received by the mirror 905. The mirror 905 includes an MLD coating as described above that is configured to convert the first polarization state of electromagnetic radiation 940 to a second polarization state, which is reflected as electromagnetic radiation 945. The mirror 905 is positioned in front of an imaging telescope 900 and is optically coupled to the imaging telescope 900. The imaging telescope 900 directs electromagnetic radiation 945 to an imaging detector 925. The imaging telescope may include one or more reflective optical elements, indicated at 920, configured to direct and focus the electromagnetic radiation 945 onto the imaging detector 925. In some embodiments, the imaging telescope 900 includes a three-mirror anastigmat as described above. In addition, the one or more reflective optical elements 920 may be positioned off-axis from an optical axis 935 of the imaging telescope 900, and may be oriented at a compound angle relative to the mirror 905.

According to the configuration shown in FIG. 9, the imaging detector 925 is located at the image plane 930. The imaging detector 925 may be any type of cooled or uncooled detectors, such as a focal plane array. In some embodiments, the imaging detector 925 is configured for multi-spectral analysis. For instance, the imaging detector 925 may be configured for VIS and IR spectral ranges, including wavelength bands within the VIS and IR spectral ranges. In some embodiments, the imaging detector 925 may be configured to detect light having a wavelength of about 400 nm to about 1000 nm. As will be appreciated, other spectral ranges are within the scope of this disclosure. For instance, the detector may be configured to detect light having a wavelength of about 1000 nm to about 1700 nm. The imaging detector 925 may be configured as a silicon detector or a focal plane array (FPA) as known in the art. In some embodiments, the imaging detector 125 may include multiple FPAs that are separated from one another by beamsplitters. Each FPA may be configured to detect a different band or bands of wavelengths.

In some embodiments, the output of the imaging detector 925 is input to one or more processors (not shown in FIG. 9), such as an image processor that may in turn feed a data processor. User input and output may be provided by an interface. The image and data processors and the user interface may be of conventional design and construction.

The components of the imaging telescope and system described above can be designed on a computer with a software package. For example, the design of the components of the imaging telescope, such as mirrors used in the telescope, may be implemented by software based on design parameters specified by a user. Examples of parameters used for design optimization of the mirrors may include curvature, asphericity, and spacing between mirrors.

The configuration of the mirror 105, including the MLD coating, may also be implemented using software that utilizes a particular optical prescription set by a user that includes design objectives and constraints. The software then uses one or more algorithms to determine the physical configuration for components used in the system based on the design criteria.

A particular configuration for the MLD coating 115 may depend on several factors, including the wavelengths of interest, the thicknesses of the dielectric layers, and the variation of the index of refraction of the dielectric layers. The design criteria may include several objectives or constraints that are used by the software in arriving at a particular physical design for a particular range or ranges of wavelengths, including multi-spectral applications. For example, in some embodiments, the mirror 105 is configured to reflect at least 85% of the incoming electromagnetic radiation 140. In other embodiments, the mirror 105 may be configured to reflect at least 95% of the electromagnetic radiation. In accordance with at least one embodiment, a retardance (i.e., phase retardance or phase difference between orthogonal polarization states) of the MLD coating 115 may be substantially constant, and in some embodiments, is about zero. For instance, the MLD coating 115 may be configured to produce a retardance that has a substantially constant value (e.g., one quarter wave or 90 degrees) over a range of wavelength values of interest, including one or more wavelength bands. In another embodiment, the diattenuation (the differential attenuation of orthogonal polarization states either by scattering or absorption) of the MLD coating 115 is less than a predetermined value over a range of wavelength values of interest. For instance, in some embodiments, the diattenuation of the MLD coating is less than 1%.

EXAMPLES

The following example further illustrates the invention, and is not intended to limit the scope of the disclosure.

Figure 10:
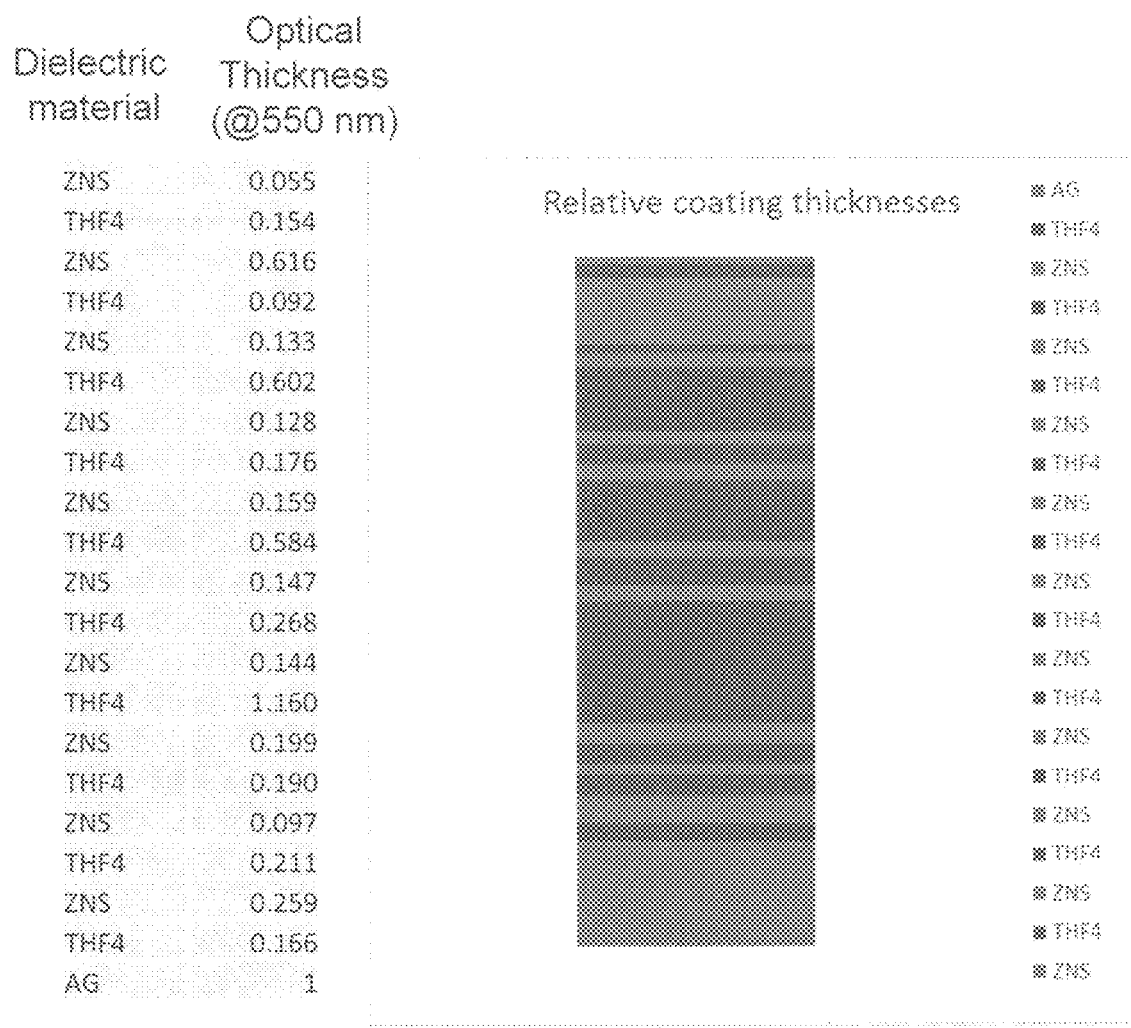
FIG. 10 is one example of a MLD coating, including material thicknesses, according to aspects of the invention.

One example of an MLD coating in accordance with aspects of the disclosure is shown in FIG. 10. The MLD coating was generated using optical modeling ZEMAX® software based on a set of design criteria. The design criteria included: materials that were transmissive in both the VIS and LWIR spectral ranges such that the design criteria included the wavelength bands listed below in FIG. 11; a reflectance of at least 85% (at the desired wavelengths); diattenuation of less than 1%; a retardance of 90 degrees; and an upper limit of 20 layers of dielectric material. The resulting ZEMAX model included a high index dielectric material of zinc sulfide (ZnS), which has a refractive index value of 2.39 (at a wavelength of 550 nm) and a low index dielectric material that was thorium tetrafluoride (ThF$_4$), which has a refractive index value of 1.51. The specific dielectric materials used in the MLD coating are not limiting as long as the result yields opposite high and low refractive index alternating layers. For instance, silicon dioxide ($SiO_2$), which has a refractive index of 1.46, could be used instead of $ThF_4$.

As indicated in FIG. 10, the mirror may be coated with silver (Ag) that provides a reflective surface upon which alternating layers of $ThF_4$ and ZnS are deposited at the indicated optical thicknesses. A total of 20 layers of dielectric material are used in the MLD coating for this particular example, but it is to be appreciated that other numbers of layers of dielectric material may be used. For instance, fewer than 20 layers may be included in the MLD coating, and greater than 20 layers, e.g., 1000+ layers, may be included in the MLD coating.

Figure 11:
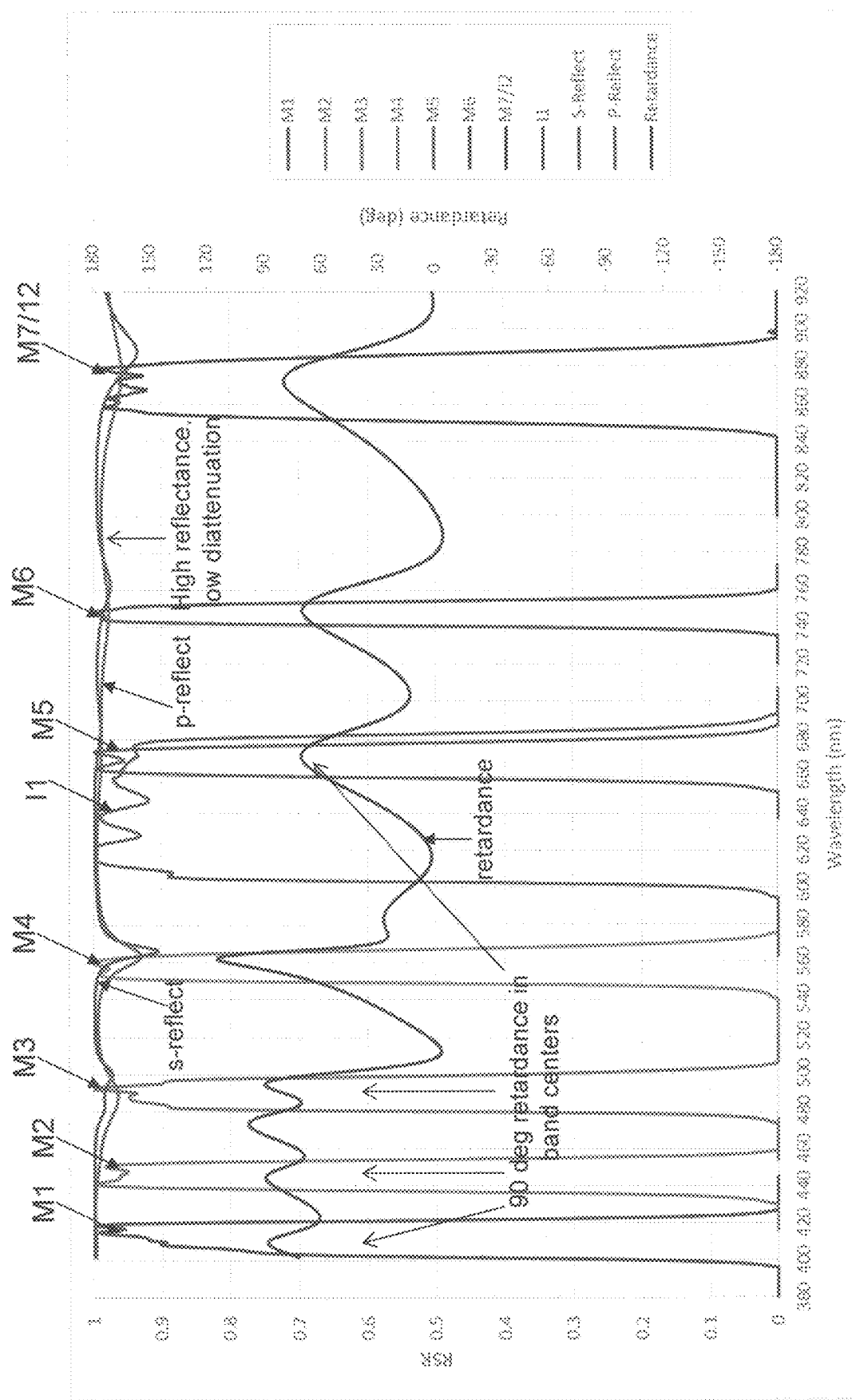
FIG. 11 is a first graph illustrating a spectral response of the MLD coating of FIG. 10, as well as s-reflectance, p-reflectance, and retardance for a first range of wavelengths.

FIG. 11 is graph illustrating the spectral response of the MLD coating of FIG. 10. The left y-axis is relative spectral response (RSR), which describes the quantum efficiency at specific wavelengths of a spectral band, the right y-axis is (reflected) retardance (deg), and the x-axis is wavelength. Table 1 gives the wavelength information for each of the VIIRS and VISNIR spectral bands included in FIG. 11, which are considered to be the multi-spectral wavelength bands of interest for this particular design.

| VIIRS/VISNIR Bands | Central Wavelength (microns) | Bandwidth (microns) | Wavelength Range (microns) | Band Explanation |
|---|---|---|---|---|
| M1 | 0.412 | 0.020 | 0.402-0.422 | Visible |
| M2 | 0.445 | 0.018 | 0.436-0.454 | Visible |
| M3 | 0.488 | 0.020 | 0.478-0.488 | Visible |
| M4 | 0.555 | 0.020 | 0.540.565 | Visible |
| M5 | 0.672 | 0.020 | 0.662-0.682 | Visible |
| M6 | 0.746 | 0.015 | 0.739-0.754 | Near IR |
| M7/12 | 0.865 | 0.039 | 0.845-0.885 | Near IR |
| I1 | 0.640 | 0.08 | 0.6-0.68 | Visible |

The results shown in FIG. 11 indicate that the MLD coating achieved high reflectance and low diattenuation through the wavelength bands of interest, as well as 90 degree retardance in the band centers.

Figure 12:
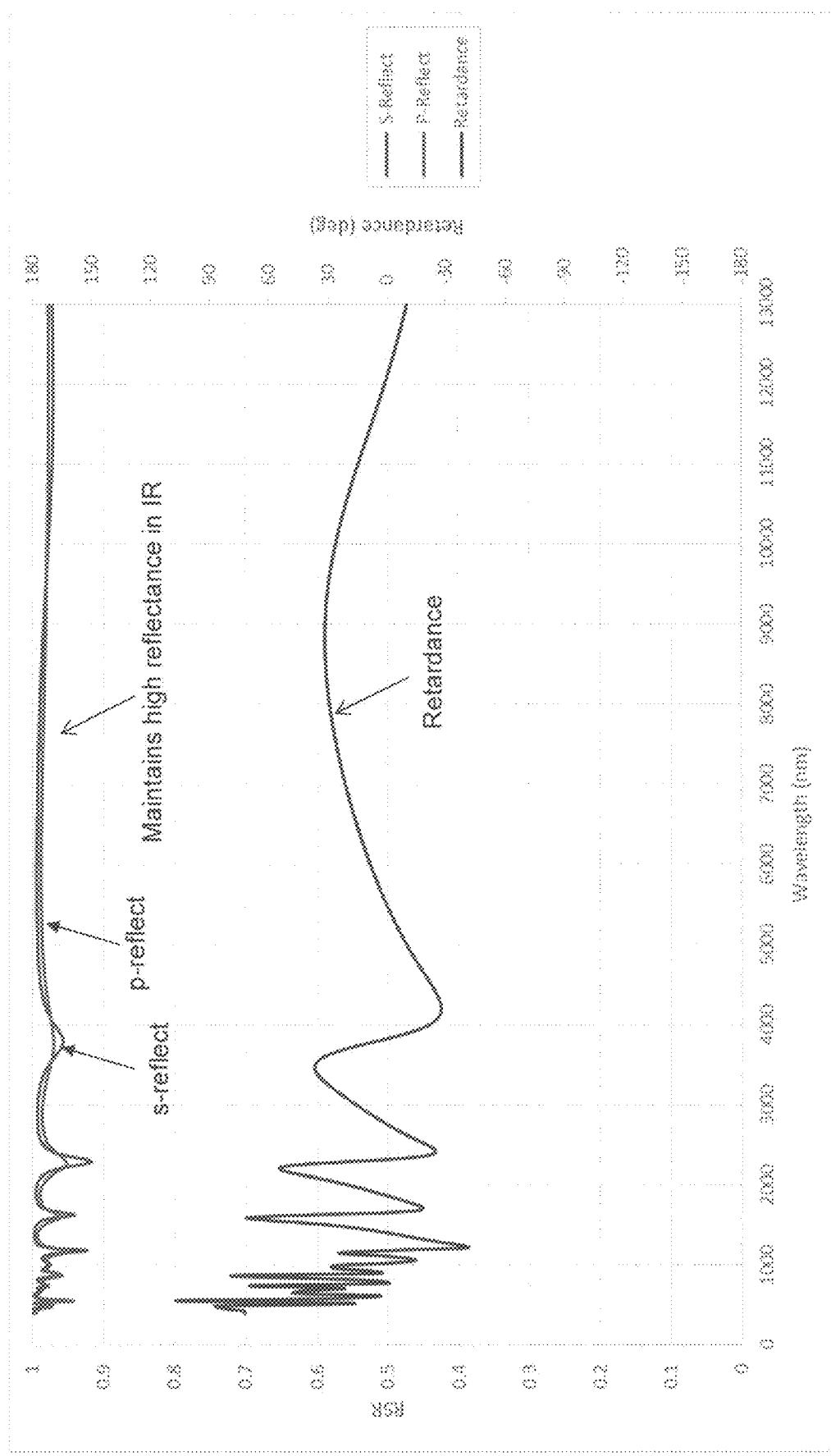
FIG. 12 is a second graph illustrating the spectral response of the MLD coating of FIG. 10, as well as s-reflectance, p-reflectance, and retardance for a second range of wavelengths.

FIG. 12 is a similar graph at FIG. 11 illustrating the spectral response of the MLD coating of FIG. 10 at wavelengths through the LWIR spectral band. The MLD coating achieves a high reflectance through the infrared. The retardance drops to zero at these infrared wavelengths, which is analogous with the design criteria since these wavelengths are not of interest in this particular design.

Having thus described several aspects of at least one example, it is to be appreciated that various alterations, modifications, and improvements will readily occur to those skilled in the art. For instance, examples disclosed herein may also be used in other contexts. Such alterations, modifications, and improvements are intended to be part of this disclosure, and are intended to be within the scope of the examples discussed herein. Accordingly, the foregoing description and drawings are by way of example only.

What is claimed is:

1. An imaging telescope, comprising:
a first mirror configured to receive electromagnetic radiation having a first polarization state and to reflect electromagnetic radiation having a second polarization state, the first mirror including a multi-layer dielectric (MLD) coating configured to convert the first polarization state to the second polarization state over a broad, multispectral wavelength range from 0.4-1.0 microns; and
a plurality of reflecting mirrors configured to receive the electromagnetic radiation having the second polarization state reflected from the first mirror, the plurality of reflecting mirrors are positioned off-axis from an optical axis and oriented at a compound angle relative to the first mirror to ensure complete polarization scrambling for all input polarization orientations, and to reflect and focus the electromagnetic radiation having the second polarization state onto an image plane of the imaging telescope.

2. The imaging telescope of claim 1, wherein the first polarization state is a linear polarization state in a plane substantially perpendicular to a direction of propagation of the electromagnetic radiation received by the first mirror and the second polarization state is one of a circular or an elliptical polarization state.

3. The imaging telescope of claim 1, wherein the first mirror is a flat mirror that is unpowered.

4. The imaging telescope of claim 1, wherein the MLD coating is configured to substantially reduce polarization sensitivity over a multi-spectral range of wavelengths of the received electromagnetic radiation.

5. The imaging telescope of claim 4, wherein the electromagnetic radiation received by the first mirror includes electromagnetic radiation that has a multi-spectral range of wavelengths and the MLD coating is configured to be substantially transmissive to the multi-spectral electromagnetic radiation.

6. The imaging telescope of claim 5, wherein the multi-spectral electromagnetic radiation includes at least one range of wavelengths within the visible region of the electromagnetic spectrum and at least one range of wavelengths within the long wavelength infrared (LWIR) region of the electromagnetic spectrum.

7. The imaging telescope of claim 6, wherein a retardance of the MLD coating is substantially constant within at least one spectral band of wavelengths within one of the visible region and the LWIR region.

8. The imaging telescope of claim 1, wherein the first mirror is configured to reflect at least 85% of the received electromagnetic radiation.

9. The imaging telescope of claim 1, wherein the MLD coating includes alternating layers of high and low refractive index dielectric materials.

10. The imaging telescope of claim 9, wherein a refractive index difference between a pair of layers adjacent to one another in the MLD coating is at least about 0.10.

11. The imaging telescope of claim 8, wherein the retardance is about 90 degrees.

12. The imaging telescope of claim 1, wherein a diattenuation of the MLD coating is less than 1%.

13. The imaging telescope of claim 1, wherein the plurality of reflective mirrors includes:
a primary mirror optically coupled to the first mirror and configured to receive and further reflect the electromagnetic radiation having the second polarization state reflected from the first mirror;
a secondary mirror optically coupled to the primary mirror and configured to receive and further reflect the electromagnetic radiation having the second polarization state reflected from the primary mirror; and
a tertiary mirror optically coupled to the secondary mirror and configured to receive the electromagnetic radiation having the second polarization state reflected from the secondary mirror and to reflect and focus the electromagnetic radiation having the second polarization state onto the image plane.

14. The imaging telescope of claim 13, wherein the primary, secondary, and tertiary mirrors are configured as a three mirror anastigmat.

15. A space-based imaging system, comprising:
- an imaging detector;
- a system aperture;
- a mirror optically coupled to the system aperture and configured to receive electromagnetic radiation having a first polarization state through the system aperture and reflect electromagnetic radiation having a second polarization state, the mirror including a multi-layer (MLD) coating configured to convert the first polarization state to the second polarization state over a broad, multispectral wavelength range from 0.4-1.0 microns; and
- an off-axis imaging telescope optically coupled to the mirror and configured to direct and focus the electromagnetic radiation having the second polarization state onto the imaging detector, the off-axis imaging telescope including a plurality of reflecting mirrors configured to receive the electromagnetic radiation having the second polarization state reflected from the mirror, the plurality of reflecting mirrors are positioned off-axis from an optical axis and oriented at a compound angle relative to the mirror to ensure complete polarization scrambling for all input polarization orientations, and to reflect and focus the electromagnetic radiation having the second polarization state onto the image plane.

16. The space-based imaging system of claim 15, wherein the first polarization state is a linear polarization state in a plane substantially perpendicular to a direction of propagation of the electromagnetic radiation received by the mirror and the second polarization state is one of a circular or an elliptical polarization state.

17. The space-based imaging system of claim 16, wherein the electromagnetic radiation received by the mirror includes electromagnetic radiation that has a multi-spectral range of wavelengths and the MLD coating is configured to be substantially transmissive to the multi-spectral electromagnetic radiation.

18. The space-based imaging system of claim 17, where a retardance of the MLD coating is about 90 degrees.

19. The space-based imaging system of claim 18, wherein a diattenuation of the MLD coating is less than 1%.

* * * * *